United States Patent
Fujiwara et al.

(10) Patent No.: US 10,322,529 B2
(45) Date of Patent: Jun. 18, 2019

(54) ASSEMBLED MANDREL AND METHOD FOR PRODUCING HOLLOW STRUCTURE

(71) Applicant: MITSUBISHI HEAVY INDUSTRIES, LTD., Tokyo (JP)

(72) Inventors: Naoaki Fujiwara, Tokyo (JP); Tadashi Yazaki, Tokyo (JP); Makoto Nonaka, Tokyo (JP); Tooru Nishikawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 467 days.

(21) Appl. No.: 14/901,776

(22) PCT Filed: May 27, 2014

(86) PCT No.: PCT/JP2014/063933
§ 371 (c)(1),
(2) Date: Dec. 29, 2015

(87) PCT Pub. No.: WO2015/033625
PCT Pub. Date: Mar. 12, 2015

(65) Prior Publication Data
US 2017/0001338 A1 Jan. 5, 2017

(30) Foreign Application Priority Data
Sep. 5, 2013 (JP) .................................. 2013-184359

(51) Int. Cl.
*B29C 33/48* (2006.01)
*B29C 33/76* (2006.01)
(Continued)

(52) U.S. Cl.
CPC ............ *B29C 33/485* (2013.01); *B29C 33/48* (2013.01); *B29C 33/76* (2013.01); *B29C 43/12* (2013.01);
(Continued)

(58) Field of Classification Search
CPC ... B29C 33/0038; B29C 33/48; B29C 33/485; B29C 33/56; B29C 33/76; B29C 43/12;
(Continued)

(56) References Cited

U.S. PATENT DOCUMENTS 4,622,091 A * 11/1986 Letterman ............. B29B 15/105
156/286
4,741,683 A 5/1988 Hilke et al.
(Continued)

FOREIGN PATENT DOCUMENTS

JP 62-207633 9/1987
JP 63-41131 2/1998
(Continued)

OTHER PUBLICATIONS

JPS6341131A—Machine Translation (Year: 1988).*
(Continued)

*Primary Examiner* — Matthew J Daniels
*Assistant Examiner* — Yunju Kim
(74) *Attorney, Agent, or Firm* — Wenderoth, Lind & Ponack, L.L.P.

(57) ABSTRACT

An assembled mandrel for forming a hollow structure having a shape similar to that of the assembled mandrel, by layering a prepreg on the surface of the longitudinally oriented assembled mandrel, covering the same with a vacuum bag, heating while creating a vacuum inside the vacuum bag, and heat-curing the prepreg while pressing the same into the assembled mandrel, the assembled mandrel being characterized by being equipped with: two outer mandrel members (first mandrel members) extending in the longitudinal direction; a center mandrel member (second mandrel member) sandwiched between the two outer mandrel members, and capable of being withdrawn in the lengthwise direction from between the two outer mandrel (Continued)

members after the hollow structure has been formed; and a tape (detachable member) formed from a low-friction material and adhered to one or more of the contact surfaces between the two outer mandrel members and the center mandrel member.

4 Claims, 5 Drawing Sheets

(51) Int. Cl.
    *B29C 33/00*     (2006.01)
    *B29C 33/56*     (2006.01)
    *B29C 70/34*     (2006.01)
    *B29C 43/36*     (2006.01)
    *B29C 43/12*     (2006.01)
    *B29K 105/08*     (2006.01)
    *B29L 22/00*     (2006.01)

(52) U.S. Cl.
    CPC ............ *B29C 43/36* (2013.01); *B29C 70/342* (2013.01); *B29C 33/0038* (2013.01); *B29C 33/56* (2013.01); *B29K 2105/0872* (2013.01); *B29L 2022/00* (2013.01)

(58) Field of Classification Search
    CPC ................. B29C 43/36; B29C 70/342; B29K 2105/0872; B29L 2022/00; B29D 11/00; B29D 22/00; B32B 37/02; B32B 31/20
    USPC ................... 264/314, 2.2; 156/212, 286, 197
    See application file for complete search history.

(56) References Cited

U.S. PATENT DOCUMENTS

| | | | | |
|---|---|---|---|---|
| 7,695,662 | B2* | 4/2010 | Oyama | .................. B29D 22/00 |
| | | | | 156/197 |
| 2005/0230552 | A1 | 10/2005 | Engwall et al. | |
| 2006/0006558 | A1* | 1/2006 | Yamada | .............. B29C 33/0038 |
| | | | | 264/2.2 |
| 2008/0110563 | A1 | 5/2008 | Engwall et al. | |
| 2008/0128549 | A1 | 6/2008 | Engwall et al. | |
| 2012/0097323 | A1* | 4/2012 | Nitsch | ..................... B29C 33/76 |
| | | | | 156/212 |
| 2013/0196087 | A1 | 8/2013 | Wilson et al. | |

FOREIGN PATENT DOCUMENTS

| | | |
|---|---|---|
| JP | 2011-11474 | 1/2011 |
| JP | 2011-11477 | 1/2011 |
| JP | 2011-98527 | 5/2011 |
| WO | 2005/105402 | 11/2005 |

OTHER PUBLICATIONS

International Search Report dated Sep. 2, 2014 in corresponding International Application No. PCT/JP2014/063933.
Written Opinion of the International Searching Authority dated Sep. 2, 2014 in corresponding International Application No. PCT/JP2014/063933 (with partial English translation).
Extended European Search Report dated Mar. 18, 2016 in corresponding European Application No. 14842876.6.

* cited by examiner

ASSEMBLED MANDREL AND METHOD FOR PRODUCING HOLLOW STRUCTURE

TECHNICAL FIELD

The present invention relates to an assembled mandrel used when producing a longitudinally oriented hollow structure using a prepreg, and a method for producing a hollow structure.

BACKGROUND ART

For example, PTL 1 discloses a method for forming a hollow structure having a shape similar to that of an assembled mandrel by layering (winding) a prepreg on the surface of the longitudinally oriented assembled mandrel, covering the assembled mandrel with a vacuum bag, and heating while vacuuming the inside of the vacuum bag, thereby heat-curing the prepreg while pressing the prepreg against the assembled mandrel.

In this forming method, as a method of easily withdrawing the assembled mandrel from the formed hollow structure after the forming is completed and the prepreg is cured, as is illustrated in FIG. 6 of this document, there is a method of providing the assembled mandrel having a structure capable of being split into three pieces including an upper mandrel, a center mandrel, and a lower mandrel in advance, and first pulling out the center mandrel and then detaching and withdrawing the upper mandrel and the lower mandrel from inner wall surfaces of the hollow structure.

CITATION LIST

Patent Literature

[PTL 1] Japanese Unexamined Patent Application Publication No. 2011-11477

SUMMARY OF INVENTION

Technical Problem

However, in the above three-piece split type assembled mandrel, there is a tendency in which the center mandrel is not easily pulled out due to frictional resistance when the center mandrel is pulled from between the upper mandrel and the lower mandrel. In this state, if the center mandrel is forcibly pulled out, there is a concern that the contact surfaces between the upper mandrel, the center mandrel, and the lower mandrel may be damaged or worn out, and the durability of the assembled mandrel degrades.

Additionally, when the prepreg is formed in accordance with the shape of the assembled mandrel while being pressed and heated as described above, the melted or softened resin material of the prepreg enters the mating surfaces of the assembled mandrel due to the pressure at the time of the forming. For this reason, there is a problem in that the thickness of the completed hollow structure decreases or that quality, such as the precision of dimensions, deteriorates.

The invention has been made in view of such a situation, and an object thereof is to provide an assembled mandrel and a method for producing a hollow structure that can easily withdraw the split-type assembled mandrel after forming of the assembled mandrel, can enhance the durability of the assembled mandrel, and can prevent a situation in which resin enters the contact surfaces of the assembled mandrel and the thickness of the hollow structure decreases.

Solution to Problem

In order to solve the above object, the invention provides the followings means.

First, a first aspect of the assembled mandrel related to the invention is an assembled mandrel for forming a hollow structure having a shape (a shape along) similar to that of the assembled mandrel, by layering a prepreg on the surface of the longitudinally oriented assembled mandrel, covering the assembled mandrel with a vacuum bag, heating while vacuuming the inside of the vacuum bag, and heat-curing the prepreg while pressing the prepreg against the assembled mandrel. The assembled mandrel includes a first mandrel member that extends in a longitudinal direction; a second mandrel member that extends in the longitudinal direction, is adjacent to the first mandrel member, and is separated from the first mandrel member and withdrawn in the longitudinal direction after the forming of the hollow structure; and a planar detachable member that is disposed to cover at least one surface of facing contact surfaces between the first mandrel member and the second mandrel member.

According to the above first aspect, when the detachable member is interposed between the contact surfaces between the first mandrel member and the second mandrel member, the frictional coefficient in the contact surfaces becomes small, and the first mandrel member and the second mandrel member are easily detached from each other.

Therefore, the second mandrel member can be easily detached and withdrawn from the first mandrel member after the forming of the hollow structure. As a result, the workability when the second mandrel member and further the entire assembled mandrel are withdrawn from the hollow structure can be enhanced, the contact surfaces between the first mandrel member and the second mandrel member can be prevented from being damaged or worn out, and the durability of the assembled mandrel can be enhanced. In addition, since the detachable member covering the contact surfaces between the first mandrel member and the second mandrel member is easily replaced even if damaged, the condition of the assembled mandrel can be soundly kept for a prolonged period of time.

Moreover, by using a liquid-tight member as the detachable member interposed between the first mandrel member and the second mandrel member, the contact surfaces between the first mandrel member and the second mandrel member are liquid-tightly sealed. For this reason, when the prepreg is formed in accordance with the shape of the assembled mandrel while being pressed and heated, the melted or softened resin material of the prepreg is prevented from entering the contact surfaces of the assembled mandrel due to the pressure at the time of the forming. For this reason, a situation is prevented in which the thickness of the completed hollow structure decreases or in which quality, such as the precision of dimensions, deteriorates.

Additionally, preferably, in the first aspect, a plurality of the detachable members may be formed in the shape of a strip and may perform covering in parallel so as to extend in the longitudinal direction, and empty spaces that extend in the longitudinal direction may be provided between the respective detachable members.

In this way, if the plurality of detachable members are arrayed at predetermined intervals while the empty spaces are interposed, the area when the detachable members come into close contact with the contact surfaces between the first mandrel member and the second mandrel member decreases markedly. For this reason, the frictional resistance when the second mandrel member is detached and withdrawn from the first mandrel member can be made smaller, and the second mandrel member can be easily withdrawn.

Additionally, in the above first aspect, when the empty spaces are provided between the plurality of detachable members, resin strips made of the same kind of resin material as the prepreg may be adhered to the empty spaces via a mandrel-releasing agent.

According to the above configuration, the resin strips made of the same kind of resin material as the prepreg are sandwiched between the first mandrel member and the second mandrel member adjacent thereto, together with the detachable members. Accordingly, when the hollow structure is formed while being pressed and heated, the resin strips become soft due to heat, and the softened resin material swells toward the prepreg that forms the hollow structure due to the pressure of the pressing from between the first mandrel member and the second mandrel member (the contact surfaces), and the resin material of the prepreg is replenished.

For this reason, unlike the related art, it is possible to prevent a situation in which the resin material to form the prepreg enters a space between the first mandrel member and the second mandrel member and the thickness of the completed hollow structure decreases or in which quality, such as the precision of dimensions, deteriorates. In addition, the resin strips are interposed between the first mandrel member and the second mandrel member via the mandrel-releasing agent. For this reason, the effect of making the first mandrel member and the second mandrel member be easily detached from each other is exhibited similar to the detachable members.

Additionally, a second aspect of the assembled mandrel related to the invention is an assembled mandrel for forming a hollow structure having a shape (a shape along) similar to that of the assembled mandrel, by layering a prepreg on the surface of the longitudinally oriented assembled mandrel, covering the assembled mandrel with a vacuum bag, heating while vacuuming the inside of the vacuum bag, and heat-curing the prepreg while pressing the prepreg against the assembled mandrel. The assembled mandrel includes a first mandrel member that extends in a longitudinal direction; a second mandrel member that extends in the longitudinal direction, is adjacent to the first mandrel member, and is separated from the first mandrel member and withdrawn in the longitudinal direction after the forming of the hollow structure; and a resin strip that is sandwiched between the first mandrel member and the second mandrel member via a mandrel-releasing agent, extends in the longitudinal direction, and is made of the same kind of resin material as the prepreg.

According to the above second aspect, by sandwiching the resin strips between the first mandrel member and the second mandrel member via the mandrel-releasing agent, the first mandrel member and the second mandrel member are easily detached from each other due to the mandrel-releasing agent interposed between each mandrel member and the resin strips, and the first mandrel member and the second mandrel member after the forming of the hollow structure are easily withdrawn from each other.

For this reason, the workability when the assembled mandrel is withdrawn from the hollow structure can be enhanced, and the resin strips are interposed between the first mandrel member and the second mandrel member. Accordingly, the contact surfaces between the first mandrel member and the second mandrel member can be prevented from being damaged or worn out when the second mandrel member is withdrawn, and the durability of the assembled mandrel can be enhanced.

Moreover, when the hollow structure is formed while being pressed and heated, the resin strips become soft due to heat, and the softened resin material swells toward the prepreg that forms the hollow structure due to the pressure of the pressing from between the first mandrel member and the second mandrel member (the contact surfaces), and the resin material of the prepreg is replenished.

For this reason, unlike the related art, it is possible to prevent a situation in which the resin material to form the prepreg enters a space between the first mandrel member and the second mandrel member and the thickness of the completed hollow structure decreases or in which quality, such as the precision of dimensions, deteriorates.

Additionally, the method for producing a hollow structure is a method for producing a hollow structure having a shape (a shape along) similar to that of the assembled mandrel, by layering a prepreg on the surface of a longitudinally oriented assembled mandrel, covering the assembled mandrel with a vacuum bag, heating while vacuuming the inside of the vacuum bag, and heat-curing the prepreg while pressing the prepreg against the assembled mandrel. The method includes a detachable member covering step of covering at least one surface of facing contact surfaces between a first mandrel member that constitutes the assembled mandrel and extends in a longitudinal direction and a second mandrel member that extends in the longitudinal direction and is adjacent to the first mandrel member, with a detachable member; a mandrel assembling step of overlapping the first mandrel member and the second mandrel member on each other, thereby assembling the assembled mandrel; a prepreg layering step of layering the prepreg on the surface of the assembled mandrel; a forming step of covering the assembled mandrel, on which the prepreg has been layered, with the vacuum bag, and heating while vacuuming the inside of the vacuum bag; and a mandrel withdrawing step of separating the second mandrel member of the assembled mandrel from the first mandrel member to detach the second mandrel member in the longitudinal direction, and then, detaching the first mandrel member from the hollow structure.

According to the above method for producing a hollow structure, when the detachable member is interposed between the contact surfaces between the first mandrel member and the second mandrel member adjacent thereto, the frictional coefficient in the contact surfaces becomes small, and the first mandrel member and the second mandrel member are easily detached from each other.

Therefore, in the mandrel withdrawing step, the second mandrel member can be easily detached from the first mandrel member and withdrawn in the longitudinal direction. As a result, the workability when the assembled mandrel is withdrawn after the forming of the hollow structure can be enhanced, the contact surfaces between the first mandrel member and the second mandrel member can be prevented from being damaged or worn out, and the durability of the assembled mandrel can be enhanced.

Advantageous Effects of Invention

As described above, according to the assembled mandrel and the method for producing a hollow structure related to the invention, the split-type assembled mandrel can be easily withdrawn after the forming of the hollow structure, the durability of the assembled mandrel can be enhanced, and a situation in which resin enters the contact surfaces of the assembled mandrel and the thickness of the hollow structure decreases can be prevented.

DESCRIPTION OF EMBODIMENTS

Hereinafter, embodiments of the invention will be described referring to FIGS. 1 to 5.

[First Embodiment]

Figure 1:
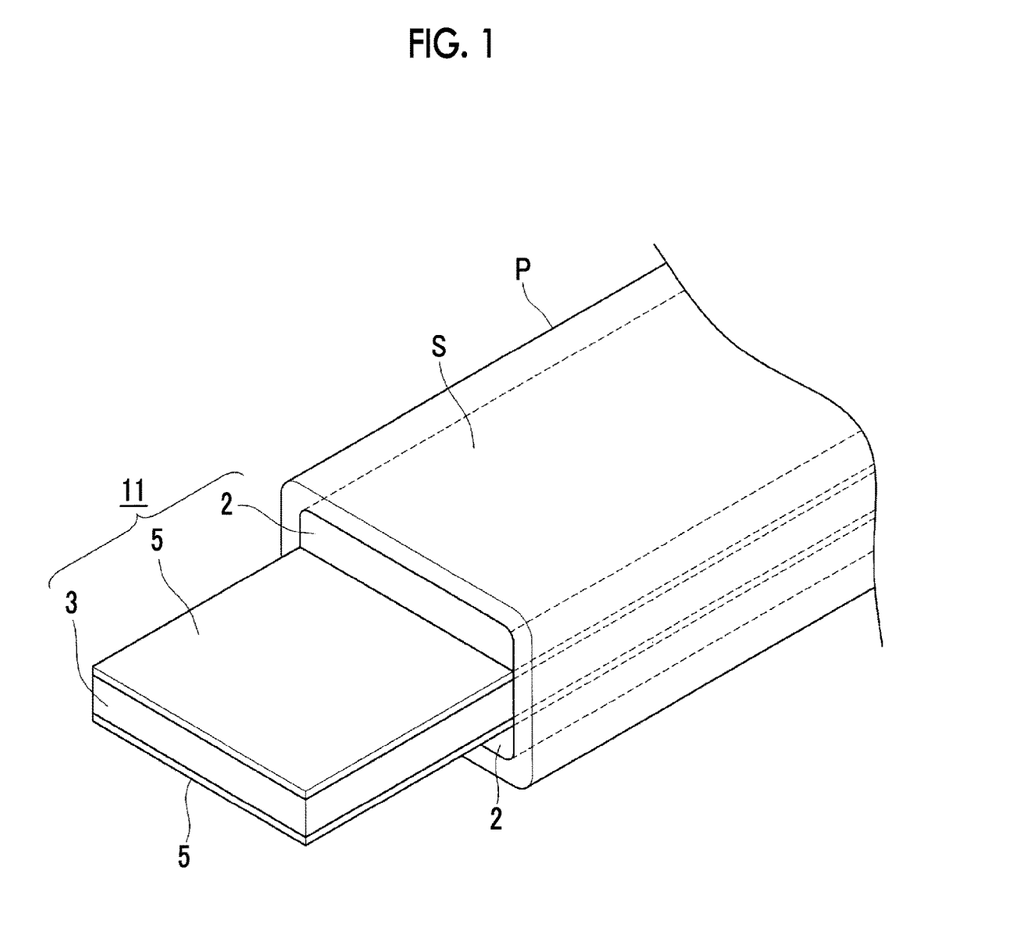
FIG. 1 is a perspective view of an assembled mandrel illustrating a first embodiment of the invention.

FIG. 1 is a perspective view of an assembled mandrel 11 illustrating a first embodiment of the invention.

The assembled mandrel 11 is used in order to form a longitudinally oriented hollow structure S, such as a rotor blade of a helicopter, using a prepreg P. Specifically, the assembled mandrel is used for performing the so-called autoclave forming in which the hollow structure S having a shape (a shape along) similar to that of the assembled mandrel 11 is formed by layering (winding) the prepreg P on the surface of the assembled mandrel 11, covering the assembled mandrel with a vacuum bag V as will be described below, and hot-forming while vacuuming the inside of the vacuum bag V, thereby heat-curing the prepreg P while pressing the prepreg P against an outer peripheral surface of the assembled mandrel 11. Then, after this autoclave forming, the assembled mandrel 11 is withdrawn from the hollow structure S and the hollow structure S is completed.

The assembled mandrel 11 is equipped with two outer mandrel members 2 (first mandrel members) that extend in a longitudinal direction, and a center mandrel member 3 (second mandrel member) that is sandwiched between the outer mandrel members 2. The center mandrel member 3 is capable of being withdrawn in the longitudinal direction from between the two outer mandrel members 2 after the forming of the hollow structure S.

Additionally, a tape 5 (detachable member) formed of a low-friction material is adhered to at least one surface of the facing contact surfaces between the two outer mandrel members 2 and the center mandrel member 3. Although the tapes 5 are respectively adhered to both surfaces of the center mandrel member 3 in the present embodiment, the tapes 5 may be respectively adhered to the outer mandrel members 2 or may be respectively adhered to both of the outer mandrel members 2 and the center mandrel member 3.

Fluororesin-based materials, such as polytetrafluoroethylene (registered trademark: Teflon), are preferable as materials for the tapes 5. However, if detachability and heat resistance are excellent, for example, other materials, such as polypropylene, polyarylate, diacetylcellulose, triacetylcellulose, acetylcellulose butylate, silicone-based resins, and alkyd-based resins, are also considered. Moreover, films made of the above respective materials, films that are coated with the above respective materials, or the like may be used instead of using the adhesive tapes 5 as the detachable members.

Figure 2:
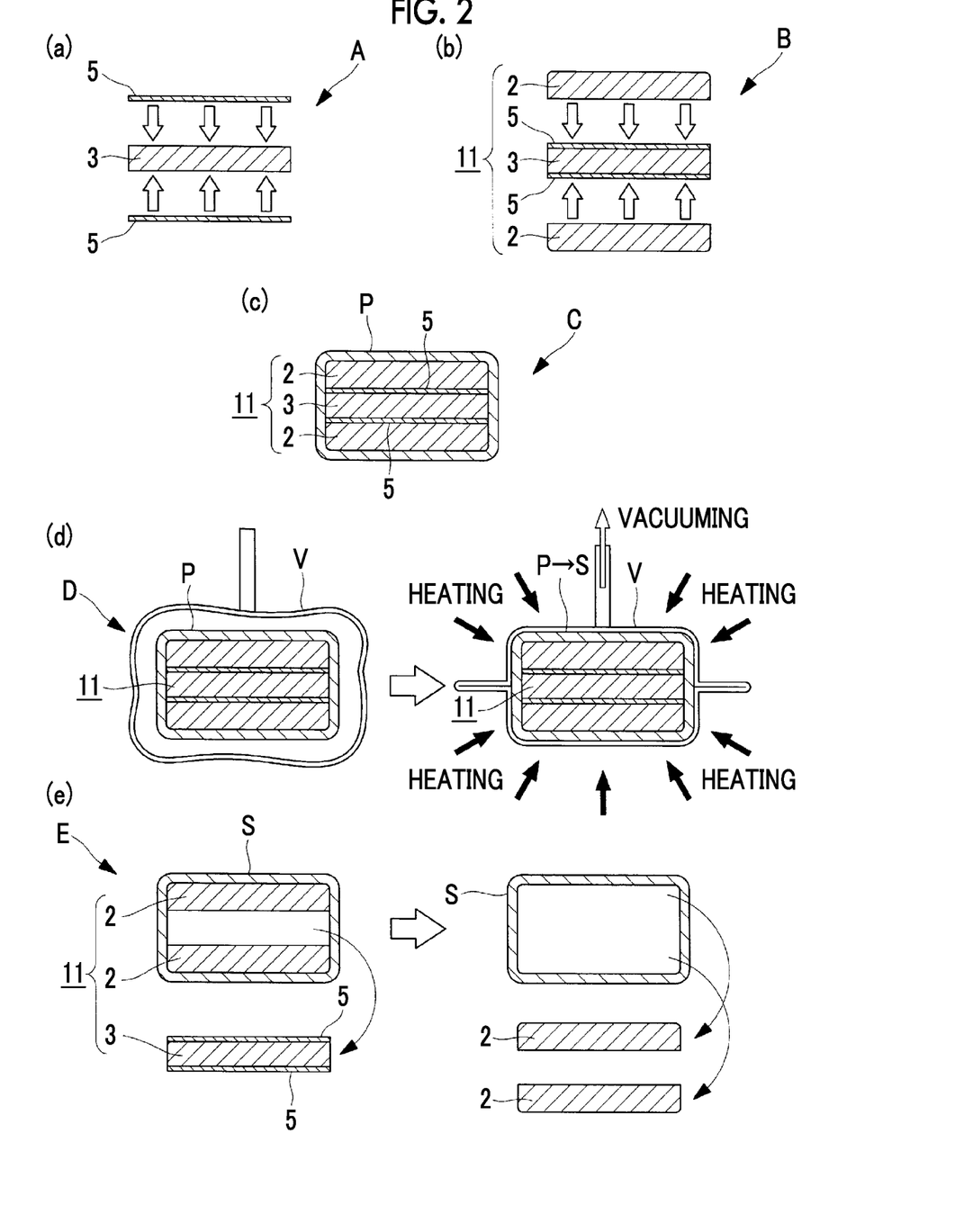
FIG. 2 illustrates a method for producing a hollow structure related to the invention, and (a) is a view illustrating a detachable member covering step, (b) is a view illustrating a mandrel assembling step, (c) is a view illustrating a prepreg layering step, (d) is a view illustrating a forming step, and (e) illustrates a mandrel withdrawing step.

Next, a method for producing the hollow structure S using the assembled mandrel 11 will be described referring to FIG. 2(a) to FIG. 2(e).

First, as illustrated in FIG. 2(a), the tapes 5 are respectively adhered to both surfaces (contact surfaces) of the center mandrel member 3 that constitutes the assembled mandrel 11 (detachable member covering step A). The tapes 5 may be respectively adhered to the contact surfaces of the outer mandrel members 2 instead of being adhered to both the surfaces of the center mandrel member 3.

Next, as illustrated in FIG. 2(b), the assembled mandrel 11 is assembled by overlapping the two outer mandrel members 2 on the center mandrel member 3 having the tapes 5 adhered to both the surfaces thereof, respectively, (mandrel assembling step B). In this case, if a mandrel-releasing agent is coated between the tapes 5 and the outer mandrel members 2, this is more preferable.

Next, as illustrated in FIG. 2(c), the prepreg P is layered on the surface of the assembled mandrel 11 (prepreg layering step C).

Next, autoclave forming in which the assembled mandrel 11 on which the prepreg P has been layered is covered with the vacuum bag V as illustrated on the left side of FIG. 2(d), and thereafter, as illustrated on the right side of FIG. 2(d), the inside of the vacuum bag V is heated while being vacuumed is performed (forming step D).

In the forming step D, if a predetermined heating time passes and the prepreg P is heat-cured, the hollow structure S is completed. Thereafter, the assembled mandrel 11 is withdrawn together with the hollow structure S from the vacuum bag V. First, as illustrated on the left side of FIG. 2(e), the center mandrel member 3 of the assembled mandrel 11 is detached from between the two outer mandrel members 2 and is withdrawn in the longitudinal direction, and thereafter, as illustrated on the right side of FIG. 2(e), the two outer mandrel members are withdrawn from the hollow structure S (mandrel withdrawing step E). By previously withdrawing the center mandrel member 3 from between the two outer mandrel members 2, the two outer mandrel members 2 can be easily withdrawn from the hollow structure S. Accordingly, the hollow structure S is completed.

According to the assembled mandrel 11 configured as described above and the method for producing the hollow structure S, the tapes 5 formed of a low-friction material, such as fluororesin, are respectively interposed between the facing contact surfaces between the two outer mandrel members 2 and the center mandrel member 3 sandwiched therebetween. Accordingly, the frictional coefficient between the outer mandrel members 2 and the center mandrel member 3 becomes small, and the outer mandrel members 2 and the center mandrel member 3 are easily detached from each other.

Therefore, in the mandrel withdrawing step E, when the center mandrel member 3 is first withdrawn from between the two outer mandrel members 2 in the longitudinal direction, it is very easy to withdraw the center mandrel member 3. For this reason, the workability when the center mandrel member 3 is withdrawn can be markedly enhanced, the contact surfaces between the outer mandrel members 2 and the center mandrel member 3 can be prevented from being damaged or worn out, and the durability of the assembled mandrel 11 can be rapidly enhanced.

Since the tapes 5 are easily replaced even if damaged, the condition of the assembled mandrel 11 can be soundly kept for a prolonged period of time by replacing the tapes 5 periodically.

Moreover, by using liquid-tight tapes as the tapes 5 interposed between the outer mandrel members 2 and the center mandrel member 3, respectively, the portions between the outer mandrel members 2 and the center mandrel member 3 are liquid-tightly sealed. For this reason, when the prepreg P is formed in accordance with the shape of the assembled mandrel 11 while being pressed and heated inside the vacuum bag V, the melted or softened resin material of the prepreg P enters splitting surfaces of the assembled mandrel 11 due to the pressure at the time of the forming. For this reason, the thickness of the completed hollow structure S can be prevented from decreasing and precision can be prevented from degrading.

[Second Embodiment]

Figure 3:
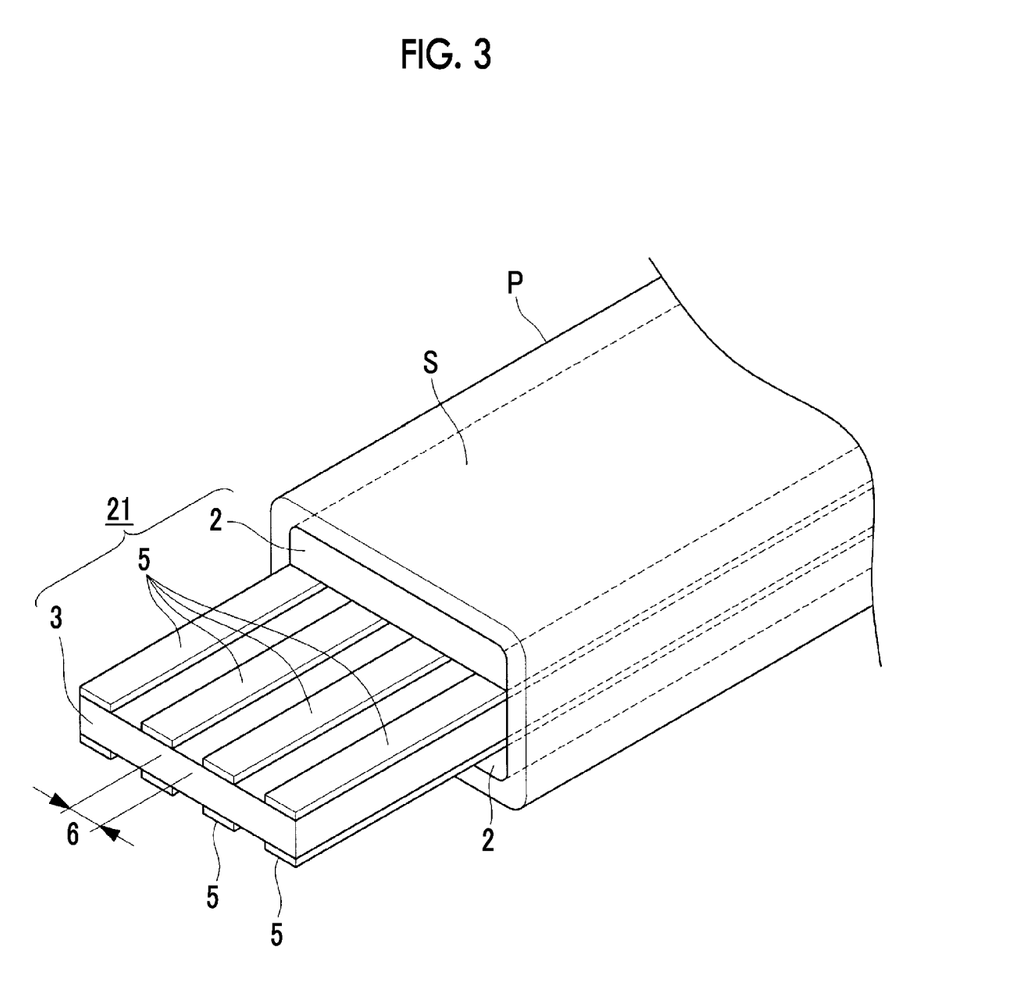
FIG. 3 is a perspective view of an assembled mandrel illustrating a second embodiment of the invention.

FIG. 3 is a perspective view of an assembled mandrel 21 illustrating a second embodiment of the invention.

In this second embodiment, the tapes 5 formed of a low-friction material similar to the first embodiment are respectively adhered to both surfaces of the center mandrel member 3 that constitutes the assembled mandrel 21. However, a plurality of the tapes 5 extend in the longitudinal direction and are adhered in parallel to each surface, and a plurality of empty spaces 6 that extend in the longitudinal direction are provided between these respective tapes 5. The other components are the same as those of the first embodiment.

For example, the width dimension of the plurality of tapes 5 is 10 mm, and the width dimension of the empty spaces 6 is also 10 mm. The number of the tapes 5 and the width dimensions of the tapes 5 and the empty spaces 6 can be appropriately changed according to the dimension of the hollow structure S. Additionally, the width dimensions of the tapes 5 and the empty spaces 6 are not necessarily the same dimensions altogether. In addition, the tapes 5 may be respectively adhered to the bonding surfaces of the outer mandrel members 2 instead of being adhered to both the surfaces of the center mandrel member 3.

In this way, the areas of the tapes 5 that come into close contact with the outer mandrel members 2 (or the center mandrel member 3) are markedly reduced by adhering the plurality of tapes 5 at predetermined intervals to each of both surfaces (or the bonding surfaces of the outer mandrel members 2) of the center mandrel member 3, and providing the empty spaces 6 between the tapes. For this reason, the frictional resistance when the center mandrel member 3 is withdrawn from between the outer mandrel members 2 can be made smaller than that in the case of the first embodiment, and the center mandrel member 3 can be more easily withdrawn from between the outer mandrel members 2 after the completion of the forming. Additionally, the amount of the tape members 5 to be used can be reduced, and a reduction in cost can be achieved.

[Third Embodiment]

Figure 4:
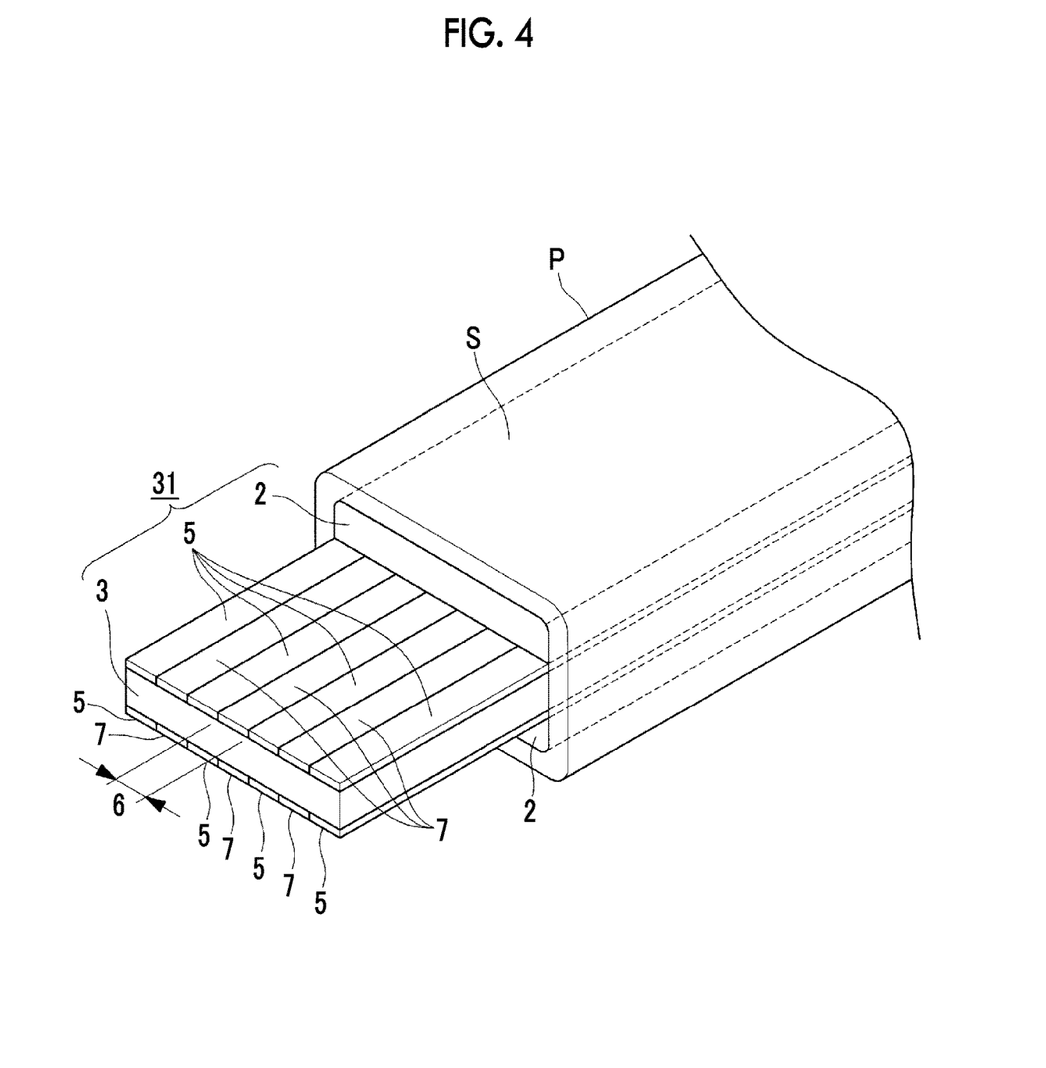
FIG. 4 is a perspective view of an assembled mandrel illustrating a third embodiment of the invention.

FIG. 4 is a perspective view of an assembled mandrel 31 illustrating a third embodiment of the invention.

In this third embodiment, the plurality of tapes 5 formed of a low-friction material similar to the second embodiment are respectively adhered to both surfaces of the center mandrel member 3 that constitutes the assembled mandrel 31, and the plurality of empty spaces 6 are provided between these respective tapes 5. A plurality of resin strips 7 are adhered to the empty spaces 6 via the mandrel-releasing agent.

The resin strips 7 are made of the same kind of resin material as the prepreg P, and are formed in the shape of a strip. In addition, the resin strips 7 may not include strengthening fibers. It is preferable to set the thickness of the resin strips 7 to be equal to the thickness of the tapes 5. Additionally, the width of the resin strips 7 is set to be equal to or slightly smaller than the width of the empty spaces 6. The other components are the same as those of the second embodiment.

In this way, the plurality of tapes 5 are adhered at predetermined intervals to each of both surfaces (or the bonding surfaces of the outer mandrel members 2) of the center mandrel member 3, and the resin strips 7 made of the same kind of resin material as the prepreg P and formed in the shape of a strip are respectively adhered to the empty spaces 6 between the tapes via the mandrel-releasing agent. Accordingly, the resin strips 7 are sandwiched together with the tapes 5 between the two outer mandrel members 2 and the center mandrel member 3 (the contact surfaces).

For this reason, in the aforementioned forming step D, when the hollow structure S is formed while being pressed and heated, the resin strips 7 become soft due to heat, and the softened resin material swells toward the prepreg P that forms the hollow structure S due to the pressure of the pressing from between the outer mandrel members 2 and the center mandrel member 3 (the contact surfaces), and the resin material of the prepreg P is replenished. In addition, the resin material of the softened resin strips 7 may be made to swell toward the prepreg P more positively by making the resin strips 7 thicker than the tapes 5.

For this reason, unlike the related art, it is possible to prevent a situation in which the resin material to form the prepreg P enters spaces between the outer mandrel members 2 and the center mandrel member 3 and the thickness of the completed hollow structure S decreases or in which the precision degrades. In addition, the resin strips 7 are interposed between the outer mandrel members 2 and the center mandrel member 3 via the mandrel-releasing agent. For this reason, the effect of making the outer mandrel members 2 and the center mandrel member 3 be easily detached from each other is exhibited similar to the tapes 5.

[Fourth Embodiment]

Figure 5:
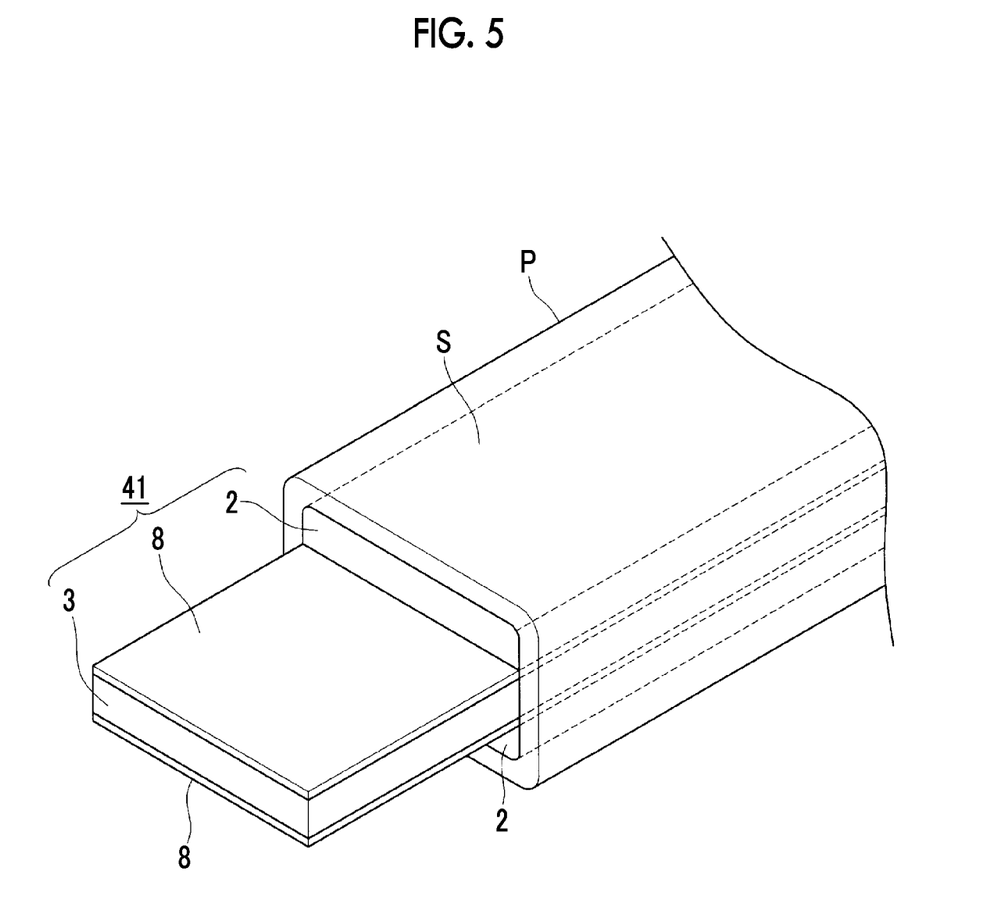
FIG. 5 is a perspective view of an assembled mandrel illustrating a fourth embodiment of the invention.

FIG. 5 is a perspective view of an assembled mandrel 41 illustrating a fourth embodiment of the invention.

In this fourth embodiment, resin strips 8 made of the same kind of resin material as the prepreg P are respectively sandwiched between the two outer mandrel members 2 and the center mandrel member 3 that constitute the assembled mandrel 41 via the mandrel-releasing agent, and the tapes 5 of the first to third embodiments are not used. The width of the resin strips 8 are set to be substantially equal to the width of the assembled mandrel (the outer mandrel members 2 and the center mandrel member 3).

In this way, by sandwiching the resin strips 8 made of the same kind of resin material as the prepreg P, respectively, between the outer mandrel members 2 and the center mandrel member 3 via the mandrel-releasing agent, the outer mandrel members 2 and the center mandrel member 3 are easily detached from each other due to the mandrel-releasing agent interposed between the respective mandrel members 2 and 3 and the resin strips 8, and the center mandrel member 3 after the forming of the hollow structure S is easily withdrawn from between the two outer mandrel members 2.

For this reason, the workability when the center mandrel member 3 is withdrawn can be enhanced, the contact surfaces between the outer mandrel members 2 and the center mandrel member 3 can be prevented from being damaged or worn out with the withdrawal of the center mandrel member 3, and the durability of the assembled mandrel 41 can be enhanced.

For this reason, similar to the third embodiment, there is an effect in which, when the hollow structure S is formed while being pressed and heated (forming step D), the resin strips 8 become soft due to heat, and the softened resin material swells toward the prepreg P that forms the hollow structure S from between the outer mandrel members 2 and the center mandrel member 3 (the contact surfaces), and the resin material of the prepreg P is replenished. This can prevent the thickness of the completed hollow structure S from decreasing or quality, such as the precision of dimensions, from deteriorating.

As described above, according to the assembled mandrels 11, 21, 31, and 41 and the method for producing the hollow structure S related to the invention, the center mandrel member 3 can be easily withdrawn after the forming of the hollow structure S between the outer mandrel members 2 of the split-type assembled mandrels 11, 21, 31, and 41, the durability of the assembled mandrels 11, 21, 31, and 41 can be enhanced, it is possible to prevent a situation in which the resin of the prepreg P flows backward to the contact surfaces between the outer mandrel members 2 and the center mandrel member 3 and the thickness of the hollow structure S decreases, and quality, such as the precision of dimensions, can be enhanced.

In addition, the invention is not limited only to the configurations of the first to fourth embodiments, alternations or improvements may be appropriately made without departing from the spirit of the invention, and embodiments to which alternations or improvements are made in this way are also be included in the scope of rights of the invention.

For example, the shapes or split structures of the assembled mandrels 11, 21, 31, and 41 (the outer mandrel members 2 and the center mandrel member 3), the shape of the hollow structure S, and the like are not limited to those of the above embodiments. That is, although the assembled mandrels 11, 21, 31, and 41 in the respective embodiments have an upward-downward three-piece split structure in which the one center mandrel member 3 is sandwiched between the two outer mandrel members 2, it is also considered that the assembled mandrels have an upward-downward two-piece split structure, a leftward-rightward three-piece split (a leftward-rightward two-piece split) structure, or the like.

REFERENCE SIGNS LIST

2: OUTER MANDREL MEMBER (FIRST MANDREL MEMBER)
3: CENTER MANDREL MEMBER (SECOND MANDREL MEMBER)
5: TAPE (DETACHABLE MEMBER)
6: EMPTY SPACE
7, 8: RESIN STRIP
11, 21, 31, 41: ASSEMBLED MANDREL
A: DETACHABLE MEMBER COVERING STEP
B: MANDREL ASSEMBLING STEP
C: PREPREG LAYERING STEP
D: FORMING STEP
E: MANDREL WITHDRAWING STEP
P: PREPREG
S: HOLLOW STRUCTURE
V: VACUUM BAG

The invention claimed is:

1. An assembled mandrel for forming a hollow structure having a shape similar to that of the assembled mandrel, by layering a prepreg on the surface of the longitudinally oriented assembled mandrel, covering the assembled mandrel with a vacuum bag, heating while vacuuming the inside of the vacuum bag, and heat-curing the prepreg while pressing the prepreg against the assembled mandrel, the assembled mandrel comprising:
   a first box member that extends in a longitudinal direction;
   a second box member that extends in the longitudinal direction, is adjacent to the first box member, and is separated from the first box member and withdrawn in the longitudinal direction after the forming of the hollow structure; and
   a planar detachable member that is disposed to cover at least a portion of one surface of facing contact surfaces between the first box member and the second box member, and is configured to make the first box member and the second box member detachable from each other,
   wherein a plurality of the detachable members are formed in the shape of a strip and perform covering in parallel so as to extend in the longitudinal direction, and empty spaces that extend in the longitudinal direction are provided between the respective detachable members.

2. The assembled mandrel according to claim 1, further comprising:
   resin strips that cover the empty spaces via a box-releasing agent and are made of the same kind of resin material as the prepreg.

3. An assembled mandrel for forming a hollow structure having a shape similar to that of the assembled mandrel, by layering a prepreg on the surface of the longitudinally oriented assembled mandrel, covering the assembled mandrel with a vacuum bag, heating while vacuuming the inside of the vacuum bag, and heat-curing the prepreg while pressing the prepreg against the assembled mandrel, the assembled mandrel comprising:
   a first box member that extends in a longitudinal direction;
   a second box member that extends in the longitudinal direction, is adjacent to the first box member, and is separated from the first box member and withdrawn in the longitudinal direction after the forming of the hollow structure; and
   a resin strip that is sandwiched between the first box member and the second box member via a box-releasing agent, extends in the longitudinal direction, and is made of the same kind of resin material as the prepreg.

4. A method for producing a hollow structure having a shape similar to that of an assembled mandrel, by layering a prepreg on the surface of the longitudinally oriented assembled mandrel, covering the assembled mandrel with a vacuum bag, heating while vacuuming the inside of the vacuum bag, and heat-curing the prepreg while pressing the prepreg against the assembled mandrel, the method comprising:
   a detachable member covering step of covering at least one surface of facing contact surfaces between a first box member that constitutes the assembled mandrel and extends in a longitudinal direction and a second box member that extends in the longitudinal direction and is adjacent to the first box member, with a planar detachable member being configured to make the first box member and the second box member detachable from each other;

an assembled mandrel assembling step of overlapping the first box member and the second box member on each other, thereby assembling the assembled mandrel;

a prepreg layering step of layering the prepreg on the surface of the assembled mandrel;

a forming step of covering the assembled mandrel, on which the prepreg has been layered, with the vacuum bag, and heating while vacuuming the inside of the vacuum bag; and an assembled mandrel withdrawing step of separating the second box member of the assembled mandrel from the first box member to detach the second box member in the longitudinal direction, and then, detaching the first box member from the hollow structure, wherein a plurality of the detachable members are formed in the shape of a strip and perform covering in parallel so as to extend in the longitudinal direction, and empty spaces that extend in the longitudinal direction are provided between the respective detachable members.

* * * * *